United States Patent Office 3,272,366
Patented Sept. 13, 1966

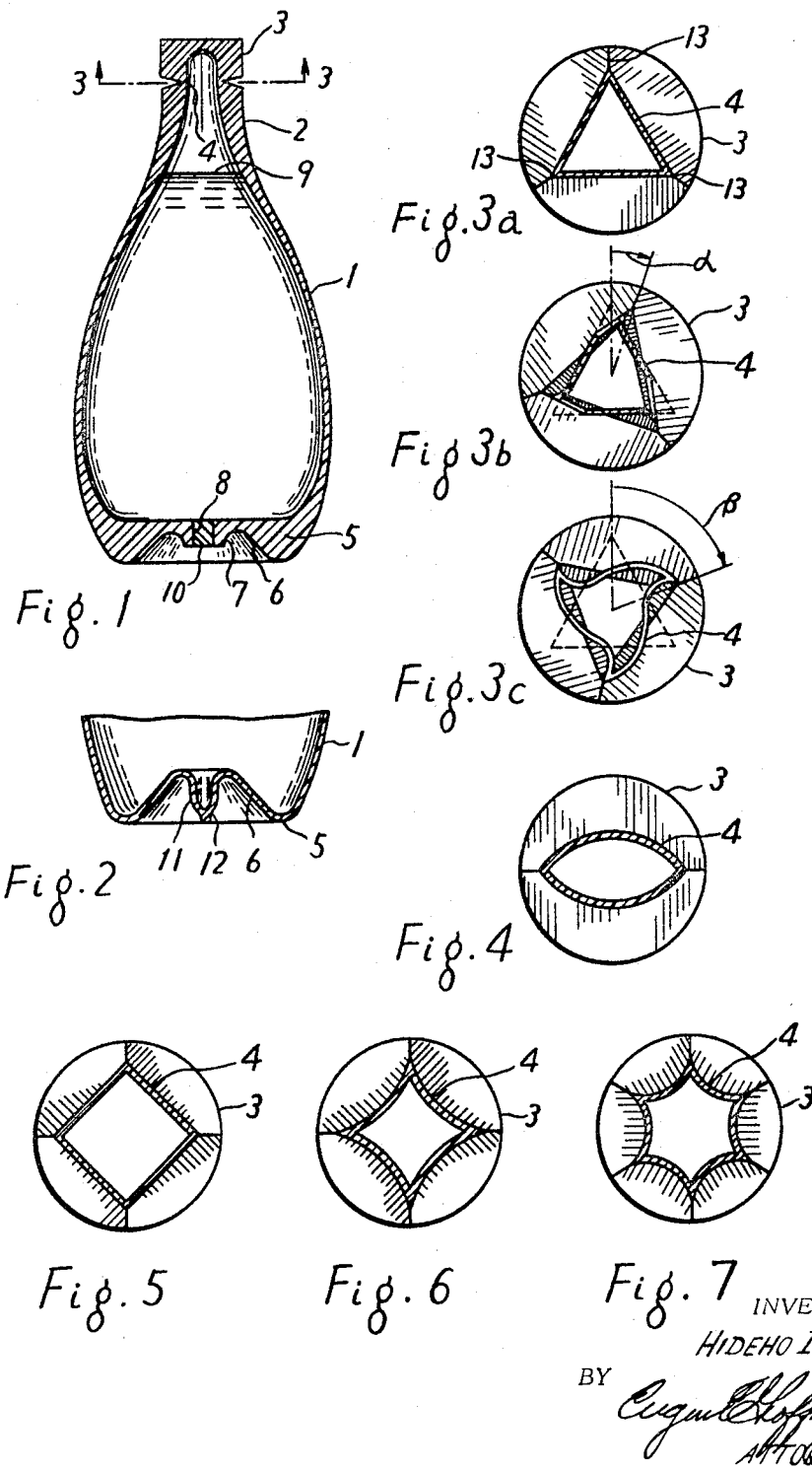

3,272,366
CONTAINER
Hideho Ikeda, Osaka-fu, Japan, assignor to
Juzo Neya, Nada-ku, Japan
Filed May 13, 1965, Ser. No. 455,409
9 Claims. (Cl. 215—2)

This invention relates to a container and more specifically to a novel and improved hermetically sealed container formed of plastic material.

Hermetically sealed containers for liquids, such as soft drinks, medicines, condiments, and the like, are usually formed of glass and sealed by means of crown caps. In many cases, the sealing is accomplished by corks, rotary caps and the like, which, while removable without the need for any special tools, do not provide as good a seal as the crown caps. Furthermore, glass bottles are generally disadvantageous because of their weight and fragility.

With the advent of plastics, this material has found considerable use in the manufacture of containers because of its durability and light weight. Furthermore, it is possible to hermetically seal plastic containers, but a special tool, such as a knife or other suitable cutting instrument, is required to open them.

This invention has as one of its objects the provision of novel and improved sealing means for a plastic container that will provide a hermetic seal and at the same time can be opened without the need for any special tools.

Another object of the invention resides in the provision of a novel and improved hermetic seal for plastic containers.

The above and other objects and advantages of this invention will become more apparent from the following description and accompanying drawings forming part of this application.

In the drawings:

FIGURE 1 is a cross-sectional view of a novel and improved container in accordance with the invention.

FIGURE 2 is a fragmentary cross-sectional view of a modified embodiment of the invention.

FIGURE 3a is a cross-sectional view of FIGURE 1 taken along the line 3—3 thereof.

FIGURES 3b and 3c are similar to FIGURE 3a and illustrates the steps of opening the sealed container.

FIGURES 4 through 7 are cross-sectional views similar to FIGURE 3a and illustrate modified configurations of a seal in accordance with the invention.

Broadly, a container in accordance with the invention includes the main body which is tapered at one end to form a relatively narrow neck portion of substantial wall thickness. The neck portion is sealed at the outer end and includes an annular groove spaced from the end to form a head portion joined to the container by a relatively thin wall. This thin wall portion is preferably provided with two or more corner portions with the corners being directed outwardly. With this arrangement, the head portion can be readily removed by twisting it relative to the remainder of the bottle, thus fracturing the relatively narrow plastic wall. In actual tests, it was found that a container in accordance with the invention could be opened more easily if the number of corner portions did not exceed six and was preferably less than six. It was also found that, if the internal angle of the corner was less than 90°, opening was further facilitated. The container may be formed of any suitable material, such as polypropylene polyesters, polyvinyl chloride, cellulose acetate, materials containing cellulose nitrate, camphor or other plasticizer, and the like. Furthermore, it has been found that when containers are made of a material, such as soft polyethylene which is relatively inelastic in the scientific sense, the container is more difficult to open, while with harder materials, such as polyvinyl chloride, which possess greater elasticity, the container is more easily opened.

Referring now to the drawings and more specifically to FIGURE 1, the illustrated container has a body portion 1 having a relatively thin wall and tapering at the upper end to form a relatively narrow hollow neck portion 2 which terminates in a closed end or head 3. The head portion 3 is integrally connected to the neck portion 2 by a relatively thin wall portion 4 formed by providing a peripheral recess in the outer surface of the neck 2. The configuration of the wall portion 4 is shown more clearly in FIGURE 3a and is of generally triangular configuration.

The lower end of the body 1 has a bottom portion 5 including a recess 6. The center of the recess is provided with an enlarged portion 7 having a hole 8 extending therethrough. This hole is used for filling the vessel, and it is then sealed by a stopper 10 preferably made of plastic. The stopper 10 may of course be cemented in the hole 8 or it may be formed of a heated plastic material welded to the walls of the hole 8. A modified form of closure is shown in FIGURE 2 wherein the bottom 5 includes a tubular portion 11 through which the vessel is filled and then this tubular portion is sealed off at 12 by a suitable heating process using infrared or high frequency heat.

With the container as described above, the head portion 3 can be removed by twisting it relative to the neck portion 2. The distortion resulting from the twisting occurs principally at the corners 13 as shown in FIGURE 3a and the character of the distortion is illustrated in FIGURE 3b when the head 3 has been moved through an angle α relative to the neck 2. In this figure, the solid line shows the side of the wall portion 4 which adjoins the head 3, while the dotted outline shows that portion of the wall 4 adjoining the neck portion 2.

When the head 3 is twisted through an additional angle, the wall portion 4 is further distorted and ultimately fractures. This occurs when the head 3 is moved approximately through an angle β as shown in FIGURE 3c.

Fracturing of the wall portion 4 is facilitated by the use of the triangular neck configuration as shown in FIGURES 3a through 3c since the corner portions cause a concentration of the stresses in such a manner that the wall 4 is readily fractured. This would not occur if the wall portion was merely annular since an exceedingly large twisting force would be required.

It has been found that a container can be opened more readily through the utilization of a minimum number of corner portions and by making the corners as sharp as possible. An excellent example of a modified form of wall structure 4 is shown in FIGURE 4. In this form of the invention, the wall 4 is biangular in that its peripheral configuration is essentially similar to the cross-section of a double convex lens.

It is possible to obtain good results with other configurations of the wall 4 as shown, for instance, in FIGURES 5, 6 and 7. In FIGURE 5, the wall contour is in the shape of a square, while in FIGURE 6 the wall 4 consists of four concave sections which result in the provision of somewhat sharper corners. FIGURE 7 shows a wall 4 which is essentially hexagonal and has a concave wall portion between each apex.

While only certain embodiments of the invention have been illustrated and described, it is apparent that alterations, modifications and changes may be made without departing from the true scope and spirit thereof as defined by the appended claims.

What is claimed is:

1. A hermetically sealed container comprising a main body and an elongated annular neck extending from said body, said neck having a relatively thick wall terminating in a sealed end portion and a peripheral groove spaced from said sealed end portion to form a relatively thin wall portion, the last said wall portion being formed with at least two relatively sharp outwardly directed corner portions.

2. A hermetically sealed container according to claim 1 wherein said corner portions have an included angle not exceeding 90°.

3. A hermetically sealed container according to claim 1 wherein the number of corners does not exceed six.

4. A hermetically sealed container according to claim 1 wherein said wall portion is triangular in section.

5. A hermetically sealed container according to claim 1 wherein said wall portion is biangular.

6. A hermetically sealed container according to claim 1 wherein said wall portion is essentially polygonal with the sides of the polygon being concave.

7. A hermetically sealed container according to claim 1 wherein said wall portion is essentially square in section.

8. A hermetically sealed container according to claim 1 wherein said container includes a filler hole in the bottom thereof.

9. A hermetically sealed container according to claim 1 wherein said container includes a recessed bottom portion having a filler hole centered in the recess.

References Cited by the Examiner

UNITED STATES PATENTS

| | | | |
|---|---|---|---|
| 579,197 | 3/1897 | Van Orman | 215—33 |
| 1,194,544 | 8/1916 | Reilly | 215—33 |
| 3,063,267 | 11/1962 | Shand et al. | 215—32 X |

JOSEPH R. LECLAIR, *Primary Examiner.*

F. T. GARRETT, *Assistant Examiner.*